Patented Mar. 31, 1942

2,277,729

UNITED STATES PATENT OFFICE 2,277,729

SOAP

Richard Thomas and Henry Bowen Oakley, Bromborough, England, assignors to Lever Brothers Company, a corporation of Maine No Drawing. Application March 22, 1938, Serial No. 197,377. In Great Britain February 23, 1938

3 Claims. (Cl. 252—109)

This invention relates to improvements in soap products.

It is well known that when soap is dissolved in "hard" water it reacts with the calcium and magnesium salts present to an extent depending upon the degree of hardness of the water. The soap which so reacts becomes insoluble and is rendered inactive for the purpose of washing. The insoluble soaps are liable to form a scum particularly when the water is heated and are deposited in a greater or less degree on clothes washed in the water.

It is an object of the present invention to obtain a soap product which can be dissolved in hard water without substantial precipitation of insoluble soaps and formation of scum.

Other objects and advantages of the invention will become apparent from the following description.

The invention in general is based on the discovery that when soaps derived from polyethylenic fatty acids, i. e. fatty acids having two or more ethylenic groups, such as linoleic acid, for example, or from mixtures of polyethylenic fatty acids with other fatty acids in certain limiting proportions, are incorporated with phosphates of the alkali metals, the resultant products when dissolved in hard water give rise to little or no precipitation of insoluble soaps or formation of scum.

The invention consists in a process for the manfacture of soap products, which comprises incorporating polyphosphates of the alkaline metals with soaps, the soaps being derived from polyethylenic fatty acids, e. g., linoleic, linolenic, clupanodonic, or from mixtures of such fatty acids, with monoethylenic fatty acids, e. g., oleic, palmitoleic, erucic or from such fatty acids or mixtures thereof with limited proportions of saturated fatty acids, e. g., stearic, palmitic, myristic.

The polyphosphates suitable for use in accordance with this invention may preferably be the salts of those phosphoric acids which contain less water than pyrophosphoric acid, but more water than metaphosphoric acid (see Gmelin's Handbuch der Anorganischen Chemie, Vol. Natrium, 8th edition, pages 924–926). Suitable polyphosphates are, for example, sodium tri-polyphosphate ($Na_5P_3O_{10}.6H_2O$) and sodium tetra-polyphosphate ($Na_6P_4O_{13}.8H_2O$).

If the polyphosphates are incorporated with soaps derived from polyethylenic or monoethylenic fatty acids, or both with saturated fatty acids such as stearic and palmitic acids, the saturated fatty acids such as stearic and palmitic acids should be present in quantities not exceeding about 18% and 25% respectively, and their total percentage should not exceed about 20–25% of the total fatty acid mixture. The mixture of saturated fatty acids may also comprise those of lower molecular weight, such as lauric and myristic acids, but the total quantities of saturated fatty acids must not exceed limits varying between 30–40% of the total mixture, the permissible limits in any particular case depending upon the quantities of the stearic and palmitic acids present, in the sense that the lower the proportions of the latter acids the larger can be the total proportions of saturated acids. In other words: if the mixture of fatty acids contains large quantities of stearic and palmitic acids, say 18% of the former or 25% of the latter, then the lauric and myristic acids, for best results, may only be present in comparatively small proportions bringing the total quantities of saturated fatty acids up to not more than about 30%. The total quantities of saturated fatty acids may, however, be increased up to 40% if the stearic or palmitic acids, or both, form only a small percentage, say less than about 10%, of the mixture of fatty acids.

The proportion of polyethylenic fatty acids required in the fatty acid mixture to ensure that the product will have the desired properties has been found to vary considerably with the nature of the other fatty acids present. Thus, if oleic acid should be the only other acid present a relatively small proportion of linoleic acid suffices, satisfactory results having been obtained with a mixture of 95% oleic acid and so little as 5% of linoleic acid. On the other hand, the high molecular saturated fatty acids, i. e. stearic and palmitic acids, when used in larger quantities tend to have an adverse effect upon the properties of the soap product, and the presence of substantial proportions of such saturated acids requires the use of larger quantities of linoleic acid. The adverse effect is considerably less in the case of saturated acids of lower molecular weight, such as lauric and myristic acids. As a general rule it can be said that the quantities of linoleic acid which are required to obtain the beneficial results of this invention are proportionate to the quantities of the saturated fatty acids present and to the molecular weight of these fatty acids. Thus, for most desirable results, it is preferred that a fatty acid mixture including, for example, 20% of palmitic and stearic acids should not contain less than about 10% of linoleic acid. Of course, larger amounts of unsaturated fatty acid soaps may be used than the minimums disclosed herein, the increased amount being controlled primarily by the characteristics desired in the final soap product.

The proportion of polyphosphates to be incorporated is to some extent dependent upon the composition of the soap and may also vary according to the nature of the product desired. For example, in utilizing phosphates of the type of hydrated sodium tri-polyphosphate or hydrated sodium tetra-polyphosphate, good results have been obtained with a ratio of about one part to every two parts of the fatty acids, but satisfactory products have also been prepared with larger or smaller proportions of polyphosphates. As a general rule, the ratio between fatty acids and polyphosphates, calculated as the anhydrous salts, may vary from about 5:1 to 2:1.

The polyphosphates may be partially replaced by orthophosphates disclosed in my copending application. Other ingredients which do not adversely affect the properties of the soap-polyphosphate mixture may be added to it, such as, for example, sodium chloride, sodium sulphate, sodium borate or sodium acetate.

A proportion of rosin also may be included in the fatty acid mixtures, if desired.

To ensure rapid solution of the soap products coming within this invention, the products may be in a finely divided form, such as powder, flakes, threads, parings, puffed granules or the like.

*Examples*

(1) To eighty parts of molten soap made from groundnut oil and containing about 63% of fatty acids are added twenty parts of hydrated sodium tri-polyphosphate. The mixture is sprayed into hot air in the known manner to produce a free-flowing soap powder.

(2) Fatty acids obtained from a mixture of three parts of groundnut oil and one part of coconut oil are converted into soap. Sixty parts of the soap so obtained, dried to about 85% fatty acid content, are mixed with twenty parts of hydrated sodium tri-polyphosphate, twelve and a half parts of sodium perborate and twelve and a half parts of 80° Twaddell neutral sodium silicate, to form a dried powder.

(3) Seventy-five parts of molten soap made from sunflower oil and containing about 63% of fatty acids are intimately mixed with twenty parts of hydrated sodium tetra-polyphosphate and ten parts of sodium chloride, and the product is converted into flakes in the known manner.

Satisfactory products according to the invention have also been obtained with soaps made, for example, from olive oil, kapok oil, soya bean oil, commercial oleins, groundnut oil, sunflower oil or other oils containing relatively large proportions of unsaturated components. It may be desirable with certain oils to slightly harden by hydrogenation to improve their characteristics for soap making. This should preferably be done, however, in such a manner as to produce as little as possible additional solid saturated acids.

We claim:

1. A soap product having improved hard water characteristics comprising a water soluble soap of a mixture of soap forming fatty acids, said soap forming fatty acids comprising at least about 10% polyethylenic fatty acids, not more than about 20% to 25% saturated soap forming fatty acids having at least 16 carbon atoms, and not more than a total amount of about 30–40% saturated soap forming fatty acids, and by weight 1 part of an alkali metal polyphosphate calculated as an anhydrous salt to 2 to 5 parts of the fatty acids in said soap, said soap product being in a solid finely divided form to ensure rapid solution in water, whereby said soap product may be dissolved in hard water without substantial precipitation of insoluble soaps.

2. A soap product having improved hard water characteristics comprising a water soluble soap of a mixture of soap forming fatty acids, said soap forming fatty acids comprising at least about 10% polyethylenic fatty acids, not more than about 20% to 25% saturated soap forming fatty acids containing at least 16 carbon atoms and not more than a total amount of about 30% saturated soap forming fatty acids, and by weight 1 part of an alkali metal polyphosphate calculated as an anhydrous salt to 2 to 5 parts of the fatty acids in said soap, said soap product being in a solid finely divided form to ensure rapid solution in water, whereby said soap product may be dissolved in hard water without substantial precipitation of insoluble soaps.

3. A soap product having improved hard water characteristics comprising a water soluble soap of a mixture of saturated and unsaturated fatty acids selected from the group consisting of stearic, lauric, palmitic, myristic, monoethylenic and polyethylenic acids in the proportions of at least 10% polyethylenic acids, not more than 18% stearic acid and not more than 25% palmitic acid, the total amount of stearic and palmitic acid not exceeding 25% and the total amount of the soaps of saturated fatty acids not exceeding 40%, and by weight about 1 part of an alkali metal polyphosphate calculated as an anhydrous salt to 2 to 5 parts of the fatty acids in said soap, said soap product being in a solid finely divided form to ensure rapid solution in water, whereby said soap product may be dissolved in hard water without substantial precipitation of insoluble soaps.

RICHARD THOMAS.
HENRY BOWEN OAKLEY.